United States Patent Office 2,913,444
Patented Nov. 17, 1959

2,913,444

PROCESS FOR POLYMERIZING CONJUGATED DIOLEFINS USING A MIXTURE OF METALLIC LITHIUM AND ALKYL LITHIUM AS THE CATALYST

Hugh E. Diem, Wadsworth, and Harold Tucker, Akron, Ohio, assignors to The B. F. Goodrich Company, New York, N.Y., a corporation of New York No Drawing. Application January 9, 1956
Serial No. 557,826

1 Claim. (Cl. 260—94.2)

The present invention relates generally to the polymerization of the 2-substituted butadiene-1,3 hydrocarbons. More specifically the invention relates to the polymerization of isoprene in the presence of an alkyl lithium compound capable of directive activity to produce an essentially all-cis 1,4 polymeric structure.

Diene hydrocarbons, and especially butadiene-1,3, have been polymerized in many different ways using a great variety of solvents, catalysts and other additives. For example, sodium metal was early utilized to polymerize butadiene-1,3 to form what was termed a "Buna 85" type rubber. Likewise, sodium "alfin" catalysts have been employed to prepare very tough polybutadiene type polymers. Likewise, aluminum chloride and other Friedel-Crafts type active metal halide catalysts have been employed for butadiene-1,3. Later, polybutadiene has been prepared in aqueous emulsion employing free radical type catalysts. In all of these known methods the resultant polymers have always had structures in which the diene units have been united in the 1,4, 1,2 and 3,4 configurations with the proportion of 1,2 type units usually preponderating. The sodium metal catalyzed polybutadienes, for example, are said to contain from 59 to 100 percent 1,2 units, depending on the temperature of polymerization. Sodium "alfin" polybutadienes contain about 35 percent 1,2 units besides a significant proportion of 3,4 units. Published data for sodium polyisoprene shows 41 to 55 percent 1,2 units. For many years it has been believed that the excellent properties of natural rubbers were due to their essentially all 1,4 structure, but no method was known which could cause the diene type monomer units to unite in this uniform fashion.

In accordance with the present invention, however, it has been discovered that an alkyl lithium compound, as defined below, is a directive catalyst for the polymerization of the 2-substituted butadiene-1,3 hydrocarbon monomers, and particularly for isoprene, which catalyst is capable of producing polymers having an essentially all-cis 1,4 configuration. Isoprene, for example, by this method can be converted to a polyisoprene homopolymer or copolymer in which substantially all (i.e. at least 90 percent) of the isoprene units are united in the head-to-tail cis 1,4 configuration. Unlike many of the corresponding polymers prepared in the presence of the sodium metal and the sodium "alfin" catalysts, the alkyl lithium catalyzed polymers are lower in molecular weight and accordingly are easier to process. By the term "essentially all-cis 1,4 configuration" it is meant that the polymer evidences a comparative infrared spectra indicative of a structure wherein at least 90 percent of the 2-substituted butadiene-1,3 units are united in the cis 1,4 configuration. Also in accordance with the present invention, when it is desired to prepare polymers of higher molecular weight than those prepared with an alkyl lithium as a sole catalyst, and to further suppress the proportion of 3,4 type addition, a combination catalyst of strong directive activity will be employed wherein the amount of the alkyl lithium catalyst is reduced and sufficient metallic lithium is added to function as a principal catalytic ingredient. In this type of polymerization the alkyl lithium compound functions as a powerful initiator of lithium metal catalyzed polymerization and the metallic lithium/ lithium alkyl catalyst ingredients combine to produce a strong directive effect on the structure of the polymer produced. When metallic lithium is employed as the sole catalyst, the polymerization is very slow to start, induction periods of 3 to 10 days or more being commonly encountered. Attempts to eliminate this induction period have included rigorous purification of all materials charged to the reaction mixture and rigorous exclusion of oxygen, moisture and other substances capable of reacting with the catalyst. More successful, however, has been the application of heat (i.e. to at least 50° C.) to initiate reaction and then cooling to control the reaction. The latter procedure, however, is difficult, and somewhat dangerous, and usually results in overheated, depolymerized polymer due to the fact that once polymerization is initiated in the presence of lithium metal, reaction is rapid, sometimes explosively so. When a small amount of alkyl lithium compound is present, however, induction periods are very short, or non-existent, even at temperatures as low as 5° C. or lower, and smooth reactions to high conversions are obtained in a matter of a few hours. With the lithium metal/alkyl lithium catalyst, as noted above, the polymers are higher in molecular weight and seem to contain a smaller proportion of 3,4 type units than those prepared with an alkyl lithium compound alone.

The alkyl lithium compound utilized in the method of this invention may be any compound wherein at least one hydrocarbon radical is attached to a lithium atom through a carbon atom. Thus, the hydrocarbon radical may be derived from a saturated alkane such as propane, butane, pentane, hexane, octane, and others; from an unsaturated aliphatic compound (alkene) such as propylene (i.e. allyl lithium), butene, pentene, and any others that are stable against disproportionation; from a benzene hydrocarbon such as benzene, toluene, xylene, and others; and from a cycloaliphatic hydrocarbon such as cyclohexane or cyclohexene. In addition lithium compounds in which more than one lithium atom is linked to the same alkyl group may be employed. The alkyl lithium compounds are conveniently prepared, for example, by reacting the corresponding alkyl, alkenyl or aryl halide with metallic lithium.

When employed as the sole catalyst, the proportion of alkyl lithium compound required will vary somewhat depending on the temperature, the monomer itself and on the purity of the monomer or monomers, and of the solvent and of other ingredients. With isoprene having a purity of 99 percent or better, and which has been refluxed with metallic sodium or maleic anhydride and then distilled to remove air and moisture, as little as 0.003 mole of alkyl lithium per mole of isoprene will cause explosive reaction at 50° C. in bulk. As little as .0002 mole of alkyl lithium per mole of pure isoprene can be employed for bulk polymerization at 50° C. When a solvent or diluent is employed slightly greater proportions of alkyl lithium can be employed, for example, 0.003 mole/mole of isoprene will effect smooth polymerization at 5 to 50° C. in a 50 percent solution in pentane. Since some of the other 2-substituted butadiene-1,3 hydrocarbons may polymerize more slowly than isoprene, slightly larger proportions of alkyl lithium compound may be required. Temperatures of up to 60 or 70° C.

can be employed, although temperatures below about 55° C. are preferred.

When the alkyl lithium compound is employed as an initiator, much smaller proportions may be employed than those specified above. In the bulk polymerization of isoprene, for example, as little as 0.1 gram mole, or slightly less, of alkyl lithium per gram atom of metallic lithium is sufficient to greatly shorten or entirely eliminate induction periods. Up to 0.5 gram mole of alkyl lithium per gram atom of lithium (in solvent) can be employed without explosive reaction. The proportion of metallic lithium (in bulk polymerization), with a good grade of isoprene, for example, may range from as low as 0.05 part by weight for every 100 parts by weight of isoprene to as much as 0.3 part per 100 parts of isoprene. With solvent present up to about 0.5 part or more of lithium metal for every 100 parts of isoprene may be employed. With the other 2-substituted butadiene-1,3 hydrocarbons, slightly larger or smaller proportions of alkyl lithium compounds and lithium metal may be required for initiation of polymerization. Likewise, impure monomers may require larger proportions of initiator and lithium metal.

In bulk polymerization the polymer is usually obtained as a solid mass which is substantially completely soluble in most rubber solvents. With both the alkyl lithium and lithium metal/alkyl lithium catalysts the polymer contains negligible amounts of gel. In contrast the corresponding sodium metal and sodium "alfin" polymers usually contain 10 to 30 percent or more of a tight, tough gel. When solvent is present during polymerization with an alkyl lithium or lithium metal/alkyl lithium catalysts, the product is obtained as a solution of completely soluble, substantially gel-free polymer.

With the catalysts of this invention solvent is not required. When utilized, it can be employed in wide proportions ranging up to 20 parts by volume or more for every one part of monomer. The use of as little as 50 percent solvent is a distinct advantage since the reaction mixture remains more fluid during that portion of the reaction wherein the most vigorous polymerization is occurring, thereby facilitating heat removal and producing a more uniform, more easily handled product. The solvents employed, of course, must be inert to the catalysts. Oxygen-, sulfur- and nitrogen-containing materials, such as water, alcohols, esters, ethers, ketones, amines, sulfides and the like, have the ability to react with and inactivate alkyl lithium compounds and metallic lithium. Suitable solvents include the saturated alkanes including propane, butane, pentane, hexane, petroleum ether, octane and higher alkane hydrocarbons, and mixtures thereof such as "Deobase" kerosine, diesel oil fractions, Fischer-Tropsch hydrocarbons, petroleum oils, petrolatum, and the like; benzene-type hydrocarbons such as benzene, toluene, xylene and others; and cycloaliphatic hydrocarbons such as cyclohexane. The solvent should be deaerated and dewatered and otherwise freed of impurities such as oxygen-containing compounds, divalent sulfur compounds, etc. before use.

The polymerization, according to the method of this invention, should be carried out in the substantial absence of oxygen, moisture, and active-oxygen, divalent sulfur and other impurities having the ability to react with the catalyst. This is most conveniently accomplished by working in an inert atmosphere, such as nitrogen, more preferably an inert hydrocarbon, or argon or helium, an inert gas flow or vapor atmosphere being employed to exclude air while handling ingredients. In most cases the monomer or monomers, and/or solvent are charged to the reaction vessel under nitrogen and the catalyst, in liquid, solution or suspension form, injected thereto. The pressure obtaining in the reaction vessel is not critical since the reaction proceeds satisfactorily at atmospheric, subatmospheric or superatmospheric pressures. The pressure resulting from the monomers and/or solvents alone is entirely satisfactory. Agitation is beneficial and glass or aluminum oxide beads added to the reaction mixture containing lithium metal seem to facilitate smoother reactions.

The polymer, whether obtained as a solid mass of bulk polymerized polymer, or as a more or less viscous solvent solution, is treated with alcohols, water, water-alcohol mixtures, acetone, methyl ethyl ketone and other solvents and non-solvents to inactivate and/or extract the lithium catalyst ingredients. Where an alkyl lithium is employed as the sole catalyst ingredient, nearly any solvent for the alkyl lithium may be added to the reaction mixture or mixed therewith to extract the alkyl lithium. A non-solvent for the polymer, such as methanol, acetone, etc. can be employed to precipitate an alkyl lithium containing polymer solution and the filtrate will be found to contain the preponderance of the alkyl lithium residues. Acidic aqueous washes applied to the bulk polymer, solvent solutions or to the precipitated solvent-polymerized polymer will efficiently extract lithium residues from the polymer.

Where finely-divided metallic lithium is present, the bulk polymer or polymer solution can be dissolved in, or diluted with, solvent and the resulting solution filtered or allowed to settle and the clear filtrate mixed with alcohol, for example, to precipitate the polymer, react with the catalyst and extract the dissolved lithium content. Here also, aqueous acidic washes may be of value in removing the lithium content. Extraction of the polymer can be carried out by solvent- or alcohol-vapor distillation or by steam distillation or by wash milling, or by grinding with alcohol and/or water in a colloid mill, in an internal mixer, and the like. The polymers, when freed of lithium alkyl compound and dissolved, reacted or massive lithium metal, are of higher apparent molecular weight, greater stability and more satisfactory processing and curing properties.

The method of this invention is applicable to the polymerization of monomeric materials containing at least a significant proportion of a 2-substituted butadiene-1,3 hydrocarbon in which a single hydrocarbon substituent is attached to the 2-carbon atom, and only to that carbon atom. Thus there may be utilized isoprene (2-methyl-butadiene-1,3), 2-ethyl-butadiene-1,3, 2-propyl-butadiene-1,3, 2-phenyl-butadiene-1,3, and the like. The surprising feature of this invention is the specificity of the alkyl lithium and lithium metal/alkyl lithium catalysts. For example, butadiene-1,3 is polymerized by these catalysts only with difficulty, the resulting polymer being obtained in poor yield and very low molecular weight. Most surprising, however, is the complete lack of directive activity of these catalysts in the polymerization of butadiene-1,3. The polymer obtained does not materially differ from that obtainable with other known non-directive catalysts. Butadiene-1,3 hydrocarbons and other conjugated dienes of more complicated structure polymerize not at all with these catalysts. In the latter class, even 2,3-dimethyl-butadiene-1,3 of high purity will not polymerize with alkyl lithium or lithium metal/alkyl lithium catalysts.

However, when a 2-substituted butadiene-1,3 hydrocarbon such as isoprene is present, butadiene-1,3 itself can be copolymerized with isoprene. Here only the isoprene units enter the polymer chain in the cis 1,4 configuration and the butadiene units are randomly oriented. The comparative infrared spectrograph of these isoprene/butadiene-1,3 copolymers very closely resemble those of physical blends of corresponding proportions of all-cis 1,4 polyisoprene and free-radical polymerized (emulsion) polybutadiene. When the isoprene is present in predominant proportion (i.e. over 50 percent), the properties of these copolymers are superior to corresponding copolymers prepared by non-directive catalysts.

The invention will now be described in greater detail with reference to several specific examples which are intended to be illustrative only.

Example I

In this example, n-amyl lithium is prepared by reacting, in pentane, n-amyl chloride or bromide with lithium metal. The lithium is hammered into a thin foil and then cut into small pieces. Commercial grade lithium ribbon could also be used.

A sufficient proportion of the above-described lithium foil is placed in a glass bottle under petroleum ether and n-amyl chloride is added thereto, in a dropwise manner, with vigorous stirring, until a slight excess of the chloride has been added. Heat evolution is noted and a noticeable proportion of the metallic lithium goes into solution and a whitish or bluish white material believed to be lithium chloride separates out. The suspension obtained is then filtered through glass wool under a helium atmosphere and a clear yellow solution of n-amyl lithium is collected under helium or nitrogen. Upon titration to determine the total alkali content about 30 percent of the original amount of lithium dispersion is found to have been converted to n-amyl lithium. A similar solution can be prepared by reducing melted lithium to a fine dispersion in petrolatum and treating the fine dispersed metal with n-amyl chloride in a suitable solvent.

The polymerization of isoprene with the n-amyl lithium prepared above is carried out in crown-capper 12 oz. "pop" bottles which are carefully cleaned, rinsed with acetone and dried. The monomeric liquid isoprene (pure grade refluxed over sodium) is added first while flushing the bottle wtih nitrogen and a measured amount of the n-amyl lithium is injected thereto by means of a glass syringe and the bottle immediately capped. The bottles are then placed in a rack rotating in a water bath at either 5° C. or 50° C.

After removal from the water bath the polymer is worked up in methanol or ethanol. The bulk polymerized samples are obtained as soft masses which are cut up in methanol containing .1 percent by weight of acetic acid and 2 percent phenyl-beta-naphthylamine antioxidant. The pentane solution polymerized polymers are obtained as viscous solutions which are pressured out of the bottles into methanol containing acetic acid and phenyl-beta-naphthylamine. The polymer precipitates as a mass which is then cut up repeatedly in fresh methanol/acetic acid/phenyl-beta-naphthylamine solutions. The polymers are then squeezed free of methanol and dried in a vacuum oven at 40 to 50° C.

Several of the bottles prepared as described above, containing 0.35 gram of n-amyl lithium per 100 grams of isoprene (0.003 mole/mole of isoprene) no solvent) exploded shortly after being placed in the water bath. With other bottles in which the isoprene is diluted with 50 percent by volume of pentane, hexane, or heptane no explosion ocurred at the 0.35 gram level of n-amyl lithium and the polymerizations started with no observable induction period and proceeded smoothly to essentially complete conversion (i.e. at least 95 percent) in as little as 8 to 10 hours. As little as 0.10 gram of n-amyl lithium per 100 grams of isoprene (about 0.0005 mole/mole of isoprene) effects smooth polymerization in bulk to substantial yields in as little as 24 hours at 50° C.

The dried polymers evidenced little tack. Infrared spectrography curves obtained from films of these polymers indicate that at least 90 percent of the isoprene units have united in the cis 1,4 configuration. These curves also show a proportion of 3,4 type isoprene units slightly greater than is present in, for example, natural rubber. The molecular weights of these essentially all-cis 1,4 polyisoprenes are somewhat low although the polymers are rubbery in nature [the dilute solution viscosities (D.S.V.) (.001 percent in benzene) being of the order of 0.2 to 2.0]. All the polymers are essentially free of gel. The polymers are very easy to process and when compounded in a "pure gum" recipe (of the type employed with natural rubber) and vulcanized strong, "snappy" vulcanizates are obtained which resemble a corresponding vulcanizate of natural hevea rubber.

Example II

In a similar fashion, 0.0027 mole of amyl lithium per mole of isoprene in a 50 percent solution of isoprene in pentane polymerizes at 50° C. to a conversion of 40 percent in 1½ hours with no observable induction period. Likewise, 0.003 mole of amyl lithium per mole of isoprene (50 percent solution in pentane) polymerizes at 5° C. to a conversion of 50 percent in 24 hours. In both cases the final conversion is substantially 100 percent. The polymers produced show infrared spectra indicative of more than 90 percent cis 1,4 structure. The polymers are free of gel and mill very readily. Upon vulcanization excellent physical properties are obtained.

Example III

"Pure" grade isoprene is refluxed over metallic sodium and then distilled into an evacuated glass tube containing 0.1 to 0.3 part/100 parts by weight of isoprene of a finely-dispersed metallic lithium in petrolatum/mineral oil. The latter is prepared by first wiping massive pieces of lithium metal free of the excess oil in which it is packed and shipped and then quickly introducing it into a heated melting vessel filled with helium gas. The vessel and its contents are then heated well above the melting point (186° C.) of lithium to put the metal in a fluid state so that it can be forced out of the vessel through a heated dip tube by means of helium pressure (helium used because of tendency of lithium to react with nitrogen at elevated temperatures). A mixture of four parts by weight of a good grade of petrolatum and 1 part of light mineral oil is melted (mix treated with metallic sodium for purification) and then pressured into a heated mixing container fitted with a rubber cap under which a helium atmosphere is maintained. An Eppenbach mixer is inserted in the melted mix and brought to top operating speed. Liquid lithium is then pressured into the agitated mix. After the liquid lithium is in, the mix is vigorously agitated for 10 minutes, with cooling to dissipate the frictional heat. The mixer is then shut off and the resulting mix placed in storage bottles under nitrogen to cool. When cooled, it sets to a semi-solid state wherein separation of lithium does not occur.

As indicated above, after the required amount of isoprene has distilled into the tube, the latter is sealed with a torch and the tube placed in a rack which rotates in a 50° C. water bath. No polymerization occurs for about 5 days. Repeat experiments show induction periods ranging from 3 to 10 days. Isoprene refluxed over maleic anhydride is similarly distilled into an evacuated tube containing the same amount of metallic lithium dispersion, the latter sealed and placed in the 50° C. water bath. In a number of experiments the induction period is about 5 days. After the induction period in most cases the polymerization proceeds satisfactorily to produce a highly-gelled polymer.

When, however, the above experiments are repeated wherein a small amount of amyl lithium or butyl lithium is combined with the lithium metal dispersion, polymerization starts almost immediately and progresses smoothly to essentially 100 percent conversion in as little as 8 to 10 hours. Amounts of the alkyl lithium are varied from as little as 1 gram mole of alkyl lithium for every 10 gram atoms of metallic lithium to as much as 0.5 gram mole of alkyl lithium for every gram atom of metallic lithium. The molecular weights of the polyisoprenes obtained in this manner are higher than those of Example I, the dilute solution viscosities ranging from 0.6 to 6.5 or higher. Infrared spectra of these polymers show at least 90 percent cis 1,4 structure and a somewhat lower proportion of 3,4 structure than is evidenced by the polymers of Examples I and II. The polymers are essentially gel-free, completely soluble in toluene, process very easily and vulcanize to produce vulcanizates having excellent properties.

*Example IV*

In this example butadiene-1,3 is substituted for isoprene in the procedure and recipe of Example III. The reaction rate is very slow and very poor yields of polymer are obtained. The polymers obtained are worked up by the procedure of Example I. Infrared spectrographic analysis of the resulting dried polymer shows that the polybutadiene has a nearly normal structure including substantial proportions of 1,2 and 3,4 structures in addition to a minor proportion of 1,4 structure. In a similar fashion 2,3-dimethyl-butadiene-1,3 and a mixture of 2-methyl- and 3-methyl-pentadiene-1,3 fail to polymerize at all.

*Example V*

The procedure of Example IV, is repeated employing mixtures of isoprene and butadiene-1,3 as the monomeric material. Infrared spectrographs indicate that substantially all (i.e. at least 80 percent) of the isoprene units are in the 1,4 configuration whereas the butadiene units have entered in a random fashion with a substantial proportion thereof present as 1,2 and 1,4 together with some 3,4 units. In fact, the spectrographs look very much like what one obtains from a corresponding physical mixture of lithium alkyl/metallic lithium catalyzed polyisoprene and an emulsion-produced, free-radical catalyzed polybutadiene. It would appear that the directive influence of the lithium alkyl containing catalysts of this invention is operative on the 2-substituted butadiene-1,3 hydrocarbon (isoprene) monomer irrespective of the presence or absence of comonomers. The isoprene/butadiene copolymers prepared as above have superior properties when compared to corresponding copolymers prepared by sodium metal catalysts, sodium "alfin" catalysts or free-radical catalysts.

We claim:

A method of producing a solid, rubbery polyisoprene in which at least 90% of the isoprene units are united cis-1,4 comprising preparing a mixture of monomeric isoprene, from about 0.05 to about 0.3 part by weight of lithium metal per 100 parts of said isoprene, and from about 0.1 to 0.5 gram mole of an alkyl lithium, in which only a single hydrocarbon group selected from the class consisting of butyl and amyl groups is linked to lithium through a carbon atom, per gram-atom of said lithium metal, and agitating the resulting mixture under an inert atmosphere at a temperature of from 5° to 55° C. to bring about polymerization of the said isoprene.

References Cited in the file of this patent

UNITED STATES PATENTS

| 1,058,056 | Harries | Apr. 8, 1913 |
| 2,377,779 | Hanford et al. | June 5, 1949 |
| 2,506,857 | Crouch | May 9, 1950 |
| 2,699,457 | Ziegler et al. | Jan. 11, 1955 |

OTHER REFERENCES

Ziegler et al.: "Annalen der Chemie," volume 51, the sections starting with pp. 13, 45, and 64 (1934).

Ziegler: "Annalen der Chemie," volume 542, pp. 90–122 (1940).

Talalay: Synthetic Rubber From Alcohol, Interscience, N.Y., 1945, p. 151.